(12) United States Patent
Moreau

(10) Patent No.: US 7,757,736 B2
(45) Date of Patent: Jul. 20, 2010

(54) DEVICE FOR REPAIRING A TUBELESS MOUNTED ASSEMBLY FOR CYCLES

(75) Inventor: Bernard Moreau, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 166 days.

(21) Appl. No.: 11/288,676

(22) Filed: Nov. 29, 2005

(65) Prior Publication Data

US 2006/0076098 A1 Apr. 13, 2006

Related U.S. Application Data

(63) Continuation of application No. PCT/EP2004/005627, filed on May 26, 2004.

(30) Foreign Application Priority Data

Jun. 3, 2003 (FR) .................................. 03 06655

(51) Int. Cl.
*B60C 5/02* (2006.01)
*B60C 5/04* (2006.01)
*B60C 17/02* (2006.01)

(52) U.S. Cl. .................................. 152/511; 152/519

(58) Field of Classification Search .................. 152/511, 152/512, 501, 514, 515, 400, 208, 210, 518–519
See application file for complete search history.

(56) References Cited

U.S. PATENT DOCUMENTS

| | | | | |
|---|---|---|---|---|
| 466,577 A | * | 1/1892 | Schrader | 152/400 |
| 489,509 A | * | 1/1893 | Sweetland | 152/311 |
| 811,109 A | * | 1/1906 | Veith | 152/501 |
| 1,564,397 A | * | 12/1925 | Armstrong | 152/501 |
| 1,737,368 A | * | 11/1929 | Fitz Gerald | 152/508 |
| 2,825,383 A | * | 3/1958 | Spelman | 152/544 |
| 2,960,138 A | * | 11/1960 | Chiodo | 152/209.5 |
| 3,134,418 A | * | 5/1964 | McConkie | 152/427 |
| 3,712,358 A | * | 1/1973 | Einarsson | 152/208 |
| 4,275,782 A | * | 6/1981 | McFarlane | 152/314 |
| 5,800,643 A | * | 9/1998 | Frankowski | 152/156 |

FOREIGN PATENT DOCUMENTS

| | | |
|---|---|---|
| DE | 100 32 300 A | 1/2002 |
| EP | 0 818 330 A | 1/1998 |
| EP | 0 893 280 A | 1/1999 |
| FR | 2 453 738 A | 11/1980 |
| GB | 128692 * | 7/1919 |
| JP | 2001-130222 A * | 5/2001 |

OTHER PUBLICATIONS

Continental Brochure entitled "Pneus 2 Roues 2004", pp. 24-25, Sep. 2003.*
English abstract and Machine translation of EP 818330, Jan. 14, 1998.*

* cited by examiner

*Primary Examiner*—Geoffrey L Knable
(74) *Attorney, Agent, or Firm*—Cohen Pontani Lieberman & Pavane LLP

(57) ABSTRACT

The invention relates to a device for repairing a tubeless mounted assembly for a cycle, more particularly for a bicycle, comprising a rim and a tire.

Figure 1:
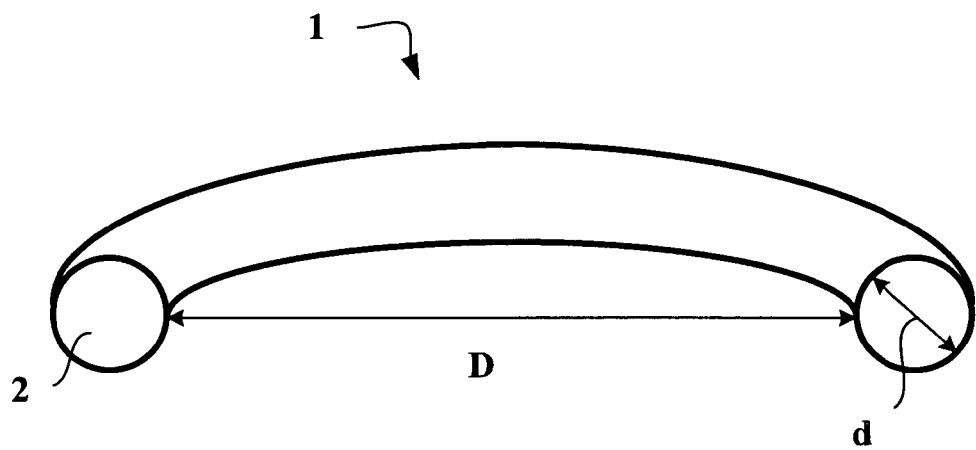

According to the invention, the repair device comprises an inner tube, the internal diameter D of which inner tube is greater than the diameter of the rim seats.

10 Claims, 2 Drawing Sheets

DEVICE FOR REPAIRING A TUBELESS MOUNTED ASSEMBLY FOR CYCLES

This is a continuation application of International Patent Application Ser. No. PCT/EP2004/005627 filed May 26, 2004, which claims benefit to French Patent Application No. 03/06655 filed Jun. 3, 2003.

The invention relates to mounted assemblies for cycles, more particularly for bicycles, comprising a rim and a tire of the tubeless type, that is to say to mounted assemblies for cycles which do not comprise an inner tube. The invention is directed more particularly at systems for repairing such mounted assemblies, the intention being to allow a user to return his/her cycle to a functional state in the event of a puncture when traveling.

Conventional mounted assemblies of the "tube" type consist of a rim, a tire and an inner tube whose function is to maintain pressure and keep the tire on the rim. In the event of a puncture, these mounted assemblies may be simply repaired. A repair may consist in identifying the source of the air leak and thus a hole in the inner tube and in sealing said hole by means of a repair patch. Such a repair is quite simple and may be carried out with minimal experience. Another solution consists in replacing the perforated inner tube with a new one, when the user has one at his/her disposal.

Mounted assemblies of the "tubeless" type consist of a rim and a tire.

A conventional rim of the tubeless type, such as described in patent EP 0 893 280 or in patent application WO 03/008208, consists of various zones; first of all, starting from an outer edge of the rim, there is a rim flange, or wing, whose essential task is to retain the bead of the tire in the inflated state; then the seat of the bead, on which the bead of the tire rests and which ensures clamping thereof as well as air-tightness, and finally a groove intended to permit mounting of the tire, the width of said groove being such that the beads ensure air-tightness at the beginning of inflation by resting on the walls of the groove. In the case of a rim comprising humps, the latter are present between the bead seat and the groove which permits mounting. Humps are projections whose function is to prevent or at least to delay the occurrence of unseating of the tire in particular in the case of a drop in pressure.

The conventional process for mounting a tubeless tire on such a rim comprises various stages, which are as follows; firstly, a part of the first bead is passed over the rim flange and this part is placed in the groove. The rest of the bead may then be passed over the flange thanks to slight ovalization of the corresponding bead wire of the tire. The same applies to passing the second bead over the flange of the rim. Mounting is then completed by a final stage involving inflation to a pressure which is such that it ensures positioning of the beads on the seats resting on the rim flanges. During the latter stage, the beads leave the mounting groove and pass over the humps, which form an obstacle to passage of said beads, as far as their respective seat.

Although not limited to such applications, the invention will be more particularly described with reference to mounted assemblies intended to be fitted on bicycles for road use. A particular feature of these mounted assemblies is that the operating pressure is of the order of 8 bar.

It is currently known to make mounted assemblies of the tubeless type for bicycles of the all terrain type; the operating pressure of such tires is of the order of 2 bar. In the event of a puncture, the user may repair the tire once the source of the air leak has been identified. If this is not the case, he/she may attempt to deal with the problem by using an inner tube corresponding to the dimensions of the mounted assembly. To do this, first of all it is necessary to remove the valve to let through that of the inner tube. Then, the user may manage to insert the beads of the tire into the mounting groove, the inner tube being inserted into the cavity of the tire, and then to inflate the assembly thus formed.

In the case of a tubeless mounted assembly intended to be fitted on bicycles for road use, the user who attempts to insert an inner tube corresponding to the dimensions of the mounted assembly encounters enormous difficulties. To achieve insertion of the beads of the tire into the mounting groove, the inner tube being inserted into the cavity of the tire, the user has necessarily to use tools, with the almost certain risk of damaging the tire and/or the inner tube. At this stage, it becomes clear, moreover, that he/she cannot ensure inflation of the assembly thus produced. It becomes clear that inflation of the inner tube results in jamming of the beads of the tire at the bottom of the groove.

The inventors thus assigned themselves the task of producing a puncture repair system for a mounted assembly of the "tubeless" type consisting of a rim and a tire for use on a road bicycle.

This objective is achieved according to the invention by a device for repairing a mounted assembly of the tubeless type for cycles, consisting of a rim and a tire comprising in particular two flexible bead wires in its beads, said rim consisting of two wings attached to two seats designed to receive the beads of the tire and separated from one another by a mounting groove, said device consisting of an inner tube, the internal diameter of which inner tube is greater than the diameter of the rim seats, and preferably greater than the external diameter of the rim.

The internal diameter of the inner tube is defined as being the diameter of the largest cylinder, of circular section, which may be inscribed in the inner tube without deformation thereof, the axis of the cylinder merging with the axis of rotation of the inner tube when the latter is incorporated into a mounted assembly.

Said internal diameter of the inner tube is measured in the shaped but not inflated state.

The diameter of the rim seats, which are intended to receive the beads of the tire, corresponds to the radially innermost diameter of the beads of the tire when the latter is mounted on the rim.

According to the invention, "axial" means a direction parallel to the axis of rotation of the tire or of the rim and "radial" means a direction intersecting the axis of rotation of the tire or of the rim and perpendicular thereto. The axis of rotation of the tire or of the rim is the axis about which the tire or the rim turns in normal use. The median circumferential plane is a plane perpendicular to the axis of rotation of the tire or of the rim and which divides the tire or the rim into two halves. A radial plane is a plane which contains the axis of rotation of the tire or of the rim.

The repair device thus consisting of an inner tube as defined above will make it possible for the user to effect a repair in the event of a puncture. In effect, tests performed have shown that the inner tube according to the invention enables the user to insert it into the tire at the time of mounting of the latter on the rim so as then to be able to effect inflation thereof.

It is clear too that inflation of the inner tube results in positioning of the beads of the tire on the rim seats; this positioning of the beads on the rim seats is achieved substantially symmetrically, which makes the cycle thus repaired comfortable to ride.

According to a preferred embodiment of the invention, the inner tube of the repair device is such that, when not inflated, the ratio of the internal perimeter of the section of the tire to the perimeter of the section of the inner tube is greater than 1.6 and preferably greater than 1.8.

The internal perimeter of the section of the tire is measured in a radial plane between the toes of the beads of the tire, the toes of the beads being the boundaries between the inner surface and the outer surface of the tire. The internal surface of a tubeless tire is the surface coming into contact with the inflation air.

According to this preferred embodiment of the invention, which specifies the perimeter and thus the diameter of the section of the repair inner tube relative to the internal perimeter of the section of the tire, the risk of pinching of the inner tube during mounting is reduced.

To reduce still further this risk of pinching the inner tube during mounting, it is also preferable for the ratio of the internal perimeter of the section of the tire to the perimeter of the section of the inner tube to be greater than 2.

An advantageous variant embodiment of a repair device according to the invention provides for the ratio of the internal diameter of the inner tube to the diameter of the section of the inner tube to be greater than 50 and preferably greater than 60.

Also advantageously, the inner tube of the repair device consists of a mixture of polymeric materials. According to the invention, the material may advantageously be one whose impermeability to air is not at the level conventionally required for an inner tube intended for a mounted assembly of the tube type. In effect, the function of the inner tube according to the invention is to repair a tubeless mounted assembly by sealing a hole. Thus, over the entire inner surface of the tire, apart from at the level of the hole, which is negligible in terms of surface area in relation to the inner surface of the tire, the inner tube duplicates a surface which is itself air-tight by definition. In the case of a tire of the tube type, the function of the inner tube is in particular to ensure that the pressure is maintained and it has thus to be as air-tight as possible.

According to a preferred embodiment of the invention, the inner tube is thus made of natural rubber. One advantage of such an embodiment is that it is possible to make a low-cost inner tube.

Another advantageous variant of the invention provides for the repair inner tube to comprise and/or be associated with means of identification. According to this variant embodiment of the invention, it is possible to simplify use of such a repair device by eliminating the risk of confusing this repair inner tube with other inner tubes for conventional use. This thus greatly reduces the risk that the user may find him/herself needing to effect a repair when traveling but in possession of an inner tube which is not suited to a tubeless type mounted assembly.

According to a first embodiment of said variant of the invention, the inner tube is distinctively colored, in particular relative to the conventional colors of inner tubes used in mounted assemblies of the tube type.

According to a second embodiment of said variant of the invention, the inner tube comprises a distinctive marking.

According to a third embodiment of said variant of the invention, the inner tube is associated with distinctive packaging.

The invention also proposes to combine these different means in pairs or all together to assist still further in distinguishing the repair inner tube according to the invention from a conventional inner tube.

Figure 2:
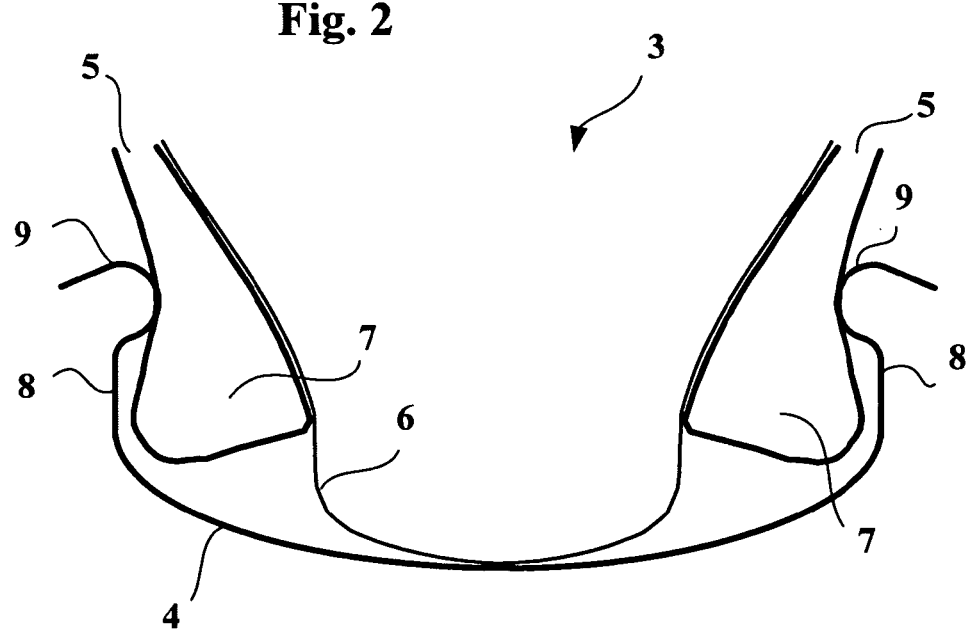
Figure 3:
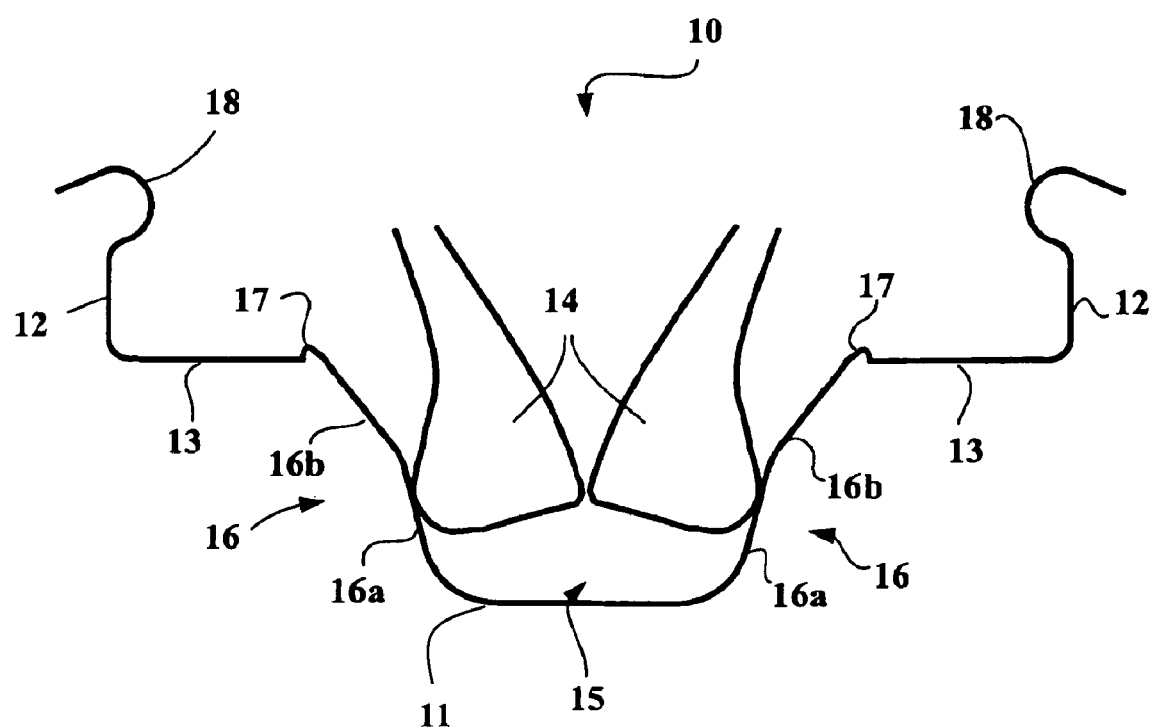

Other advantageous details and features of the invention will become clear below from the description of an example of embodiment of the invention made with reference to FIGS. 1 to 3, in which:

FIG. 1 is a schematic view in radial section of an inner tube according to the invention, FIG. 2 is a schematic partial view in radial section of a mounted assembly of the tube type, FIG. 3 is a schematic partial view in radial section of a mounted assembly of the tubeless type, prior to inflation.

To simplify understanding thereof, the Figures are not to scale.

FIG. 1 is a schematic representation of a view in radial section of an inner tube 1 according to the invention intended for a mounted assembly of dimension 22-622. The inner tube 1 has an internal diameter D of 633 mm and a diameter d of the section 2 of 12.5 mm.

The diameter of the rim seats of the tubeless type mounted assembly is 621.5 mm and the external diameter of said rim is 632.7 mm. The relationship defined according to the invention, according to which the internal diameter D of the inner tube is greater than the diameters of the rim seats of the mounted assembly, and preferably greater than the external diameter of the rim, is thus established.

Likewise, the ratio of the internal perimeter of the section of the tire, which is 63 mm, to the perimeter of the section of the inner tube is 1.604 and thus greater than 1.6.

Finally, the ratio of the internal diameter D of the inner tube to the diameter d of the section of the inner tube is 50.64 and thus greater than 50.

FIG. 2 is a schematic representation of a partial view in radial section of a mounted assembly 3 of the tube type comprising a rim 4 associated with a tire 5 and an inner tube 6. This FIG. 2 illustrates the function of the inner tube in a mounted assembly of the tube type. It is clear that the inflated inner tube 6 makes it possible to keep the beads 7 of the tire 5 against the wings 8 of the rim, where they are wedged in place by the hooks 9.

The function of a conventional inner tube used in a mounted assembly of the tube type is thus to maintain inflation pressure and thus in particular to keep the tire 5 on the rim 4.

FIG. 3 is a schematic partial view in radial section of a mounted assembly 10 of the tubeless type. The mounted assembly 10 comprises a rim 11 consisting of two wings 12, attached to two seats 13 intended to receive the beads 14 of a tire. The seats 13 are separated from one another by a mounting groove 15. The mounting groove 15 comprises walls 16 which are separated from the seats 13 by projections or humps 17.

The wings 12 are oriented substantially parallel to the circumferential median plane. The seats of the beads 13 are substantially parallel to the axis of rotation. As shown in FIG. 3, the walls 16 of the mounting groove 15 are made in two parts; first, bottom parts 16a, which form an angle of approximately 30° and are centered relative to the circumferential median plane and second or top parts 16b which form an angle of approximately 65° and are centered relative to the circumferential median plane.

The wings 12 additionally have at their upper parts hooks 18 which constitute overhangs towards the inside of the rim relative to the plane of the wings at the points of attachment of said hooks.

During mounting of a tire of the tubeless type, conventional in form, on such a rim 11, first of all the two beads 14 of the tire are introduced into the mounting groove 15 of the rim 11. FIG. 3 illustrates this phase of mounting the mounted assembly 10.

In a subsequent step, the tire is inflated; for this, the rim 11 is provided with a valve, not shown, advantageously placed in the groove bottom 15 to allow the injection of air directly between the two beads of the tire. The groove bottom 15 is of such a width that it may receive the two beads, these resting against the walls 16 to ensure that the system is air-tight. This result is obtained in particular by the presence of the inclined walls 16*a* in particular at the bottom part of the groove 15.

The beads of the tire are thus positioned on the seats 13 provided to this end, in contact with the wings 12 which retain said beads.

The wings 12 also comprise hooks 18 which likewise assist in holding the beads 14 of the tire when the pressure increases inside the tire.

A comparison of this diagram of FIG. 3, which shows a mounted assembly 10 of the tubeless type, with that of FIG. 2, which shows a mounted assembly 3 of the tube type, shows that insertion of a conventional inner tube 6 for a mounted assembly of the tube type into a mounted assembly of the tubeless type may be problematic. In effect, it is clear first of all that the design of the mounted assembly of the tubeless type leaves only a small amount of space for passage of an inner tube between the beads 14 of the tire when the latter are located in the mounting groove 15 prior to inflation. Insertion of a conventional inner tube for a mounted assembly of the tube type would thus necessitate folding of said tube in the cavity of the tire, at the risk of pinching said inner tube during inflation. Furthermore, the cavity of a road tire is of a size such that a particular degree of skill would be required to succeed in accommodating therein said conventional inner tube for a mounted assembly of the tube type.

The tests which have been performed using conventional inner tubes have shown, moreover, that, at the time of inflation, such an inner tube prevents the beads from rising up, such that they do not reach the rim seats.

When, during some tests, mounting was managed successfully, it became clear that such mounting was imperfect and made the bicycle uncomfortable or indeed dangerous to ride. In effect, the mounting obtained was asymmetrical, only one bead at best managing to pass over a hump.

In contrast, the inner tube according to the invention, whose diameter d of the section 2 is smaller relative to a conventional inner tube and whose internal diameter D is greater than that of a conventional inner tube, may be accommodated in the internal cavity of a tire prior to mounting thereof. Then, at the time of inflation of the inner tube according to the invention, the latter, due in particular to its dimensions, comes to rest substantially against the crown of the tire, at least for a first period, so as to seal the hole which is the cause of the puncture, and allows the beads to pass onto the rim seats.

It is also clear that passage of the beads onto the rim seats is obtained substantially symmetrically and uniformly, ensuring the comfort and safety of the user.

The inner tube thus defined according to the invention with unusual dimensions, whose primary function is to seal a hole, allows insertion of the beads of the tire in the mounting groove, the inner tube being inserted into the cavity of the tire, and additionally allows inflation of the mounted assembly.

During mounting of the repair inner tube according to the invention, it remains necessary, however, to remove the valve from the tubeless rim beforehand to allow through that of the repair inner tube. Only the zone of the inner tube comprising the valve comes between the beads 14 of the tire when the latter are in the mounting groove 15 of the rim prior to inflation.

The invention claimed is:

1. A mounted assembly comprising:
   a tubeless type tire comprising beads,
   a tubeless type rim comprising two wings attached to two rim seats designed to receive the beads of the tire and separated from one another by a mounting groove, and
   an inflatable inner tube having an inflation valve and being in a substantially circular shape with an internal diameter,
   wherein the internal diameter of the inner tube is greater than a diameter of the rim seats,
   wherein a ratio of the internal diameter of the inner tube to a diameter of a cross-section of the inner tube is greater than 50, and
   wherein, after being inflated, the inner tube holds the beads against the respective wings of the tubeless type rim and contacts substantially an entire inner wall of the tire to form an air-tight seal,
   whereby, at the time of inflation of the inner tube, the inner tube comes to rest substantially against an inner wall of a crown of the tire and the beads are allowed to pass onto the rim seats from the mounting groove.

2. The mounted assembly according to claim 1, wherein, in a non-inflated state, a ratio of an internal perimeter of a cross-section of the tire to a perimeter of a cross-section of the inner tube is greater than 1.6.

3. The mounted assembly according to claim 1, wherein the inner tube comprises a mixture of polymeric materials.

4. The mounted assembly according to claim 1, wherein the inner tube is made of natural rubber.

5. The mounted assembly according to claim 1, wherein, in a non-inflated state, a ratio of an internal perimeter of a cross-section of the tire to a perimeter of a cross-section of the inner tube is greater than 1.8.

6. The mounted assembly according to claim 1, wherein a ratio of the internal diameter of the inner tube to a diameter of a cross-section of the inner tube is greater than 60.

7. The mounted assembly according to claim 1, wherein, in a non-inflated state, the beads are contained in the mounting groove.

8. The mounted assembly according to claim 7, wherein, when the inner tube is inflated, the beads move out of the mounting groove and onto the rim seats respectively.

9. The mounted assembly according to claim 1, wherein, in an inflated state, the beads are supported on the rim seats respectively.

10. The mounted assembly according to claim 1, wherein an internal diameter of the inner tube is greater than an external diameter of the rim.

* * * * *